United States Patent [19]
Müller et al.

[11] 3,878,287
[45] Apr. 15, 1975

[54] CHARGING OF KILN WITH GRANULAR MATERIAL

[75] Inventors: Wolfgang Dieter Müller, Leverkusen; Ulrich Hart; Axel Lippert, both of Krefeld, all of Germany

[73] Assignee: Bayer Aktiengesellschaft, Leverkusen, Germany

[22] Filed: Mar. 22, 1973

[21] Appl. No.: 343,758

[30] Foreign Application Priority Data
Apr. 11, 1972 Germany.......................... 2217299

[52] U.S. Cl.............. 423/153; 110/104 R; 266/28; 302/39; 302/57; 432/117; 423/1; 423/110; 423/452
[51] Int. Cl......................... C01g 1/00; C22b 1/00
[58] Field of Search........... 110/104 R, 105; 302/19, 302/20, 27, 39, 51, 57, 63, 64; 266/28; 432/117

[56] References Cited
UNITED STATES PATENTS

| 245,427 | 8/1881 | Averell | 302/50 |
|---|---|---|---|
| 759,357 | 5/1904 | Edison | 302/49 X |
| 783,218 | 2/1905 | Murray | 302/20 X |
| 1,013,379 | 1/1912 | Dunn | 110/104 R |
| 1,393,562 | 10/1921 | Matthews | 302/63 X |
| 1,439,722 | 12/1922 | Allyn | 302/51 X |
| 2,516,684 | 7/1950 | Doull et al. | 302/20 X |
| 3,022,113 | 2/1962 | Chochola | 302/20 |
| 3,418,108 | 12/1968 | VonStroh | 266/28 X |

Primary Examiner—Evon C. Blunk
Assistant Examiner—W. Scott Carson
Attorney, Agent, or Firm—Burgess, Dinklage & Sprung

[57] ABSTRACT

In the operation of a kiln including feeding a granular material by means of a gas into said kiln, advancing said material through said kiln and removing a product from said kiln, the improvement in charging said kiln which comprises providing a wear-resistant mixer tube as the inlet to said kiln, blowing feeder gas from a nozzle into said tube spaced therefrom under a pressure greater than prevails in said kiln, and dropping said granular material about the outlet of said nozzle at a rate such that said granular material is conveyed by said gas into said tube. A suitable apparatus is shown. The invention is especially suited for roasting of pyrites to produce $SO_2$.

8 Claims, 1 Drawing Figure

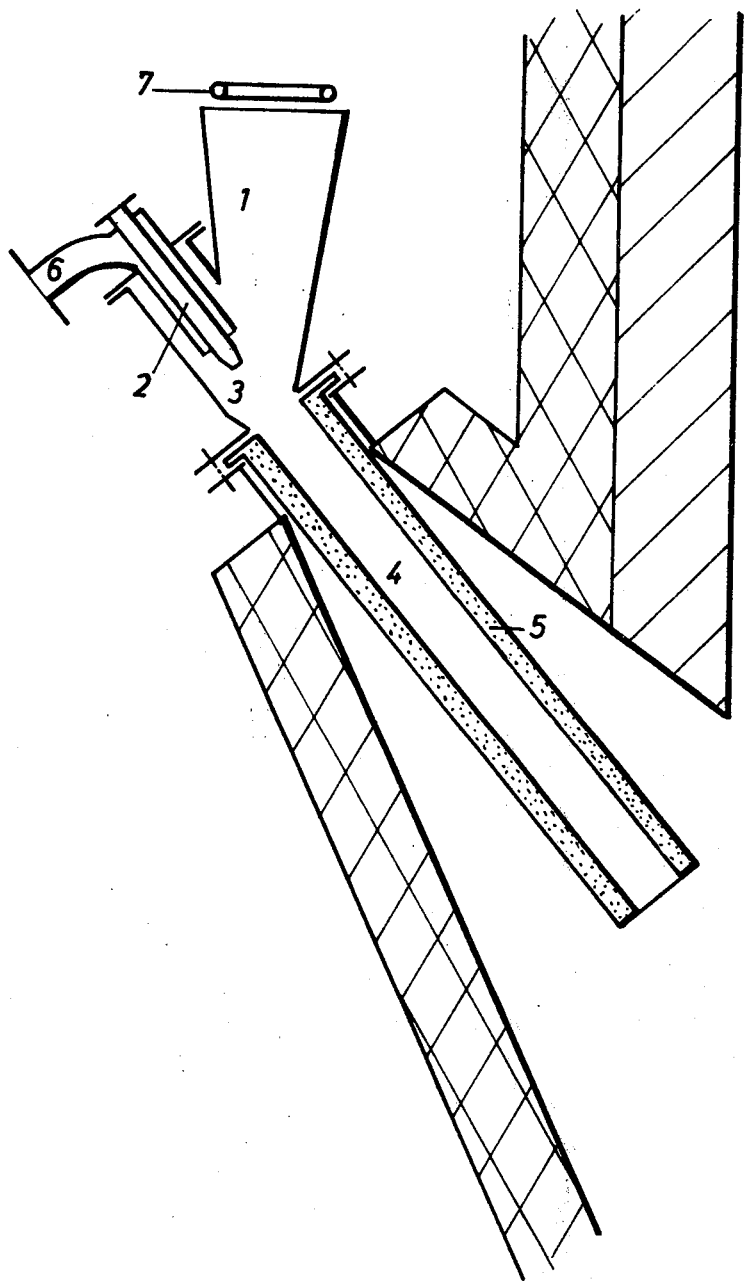

CHARGING OF KILN WITH GRANULAR MATERIAL

This invention relates to a method of charging fluidization and cylindrical rotary kilns with granular raw materials and an apparatus therefor.

Rotary bins, centrifugal belts, star feeders or screws are used in cenventional manner for feedstock input, especially in the roasting of sulfur-containing starting materials, for example, pyrites, zinc blend, etc., in fluidization and cylindrical rotary kilns. Experience has shown that machines of this kind only function satisfactorily under certain conditions, for instance the material to be introduced into the kiln must be free flowing, in other words it has to be as dry as possible. This means that the material must be stored under cover and this necessitates considerable capital investment.

The $SO_2$-containing roaster gas produced in the fluidization and cylindrical rotary kilns should not penetrate into the cold feeder units because otherwise corrosion is caused through the condensation of $SO_2$-containing dilute sulfuric acid. For this reason, the fluidization and cylindrical rotary kilns always have to be operated under reduced pressure in the vicinity of the material input or a suitable excess pressure has to be applied to prevent penetration of the roaster gases into the feeder units.

In cases where pyrites in particular is used, the feeder units have to be provided with a wear-resistant finish as protection against erosion caused by the extreme hardness of the pyrites. In conventional structures, this requirement can only be satisfied at considerable expense and at the same time, repair costs are considerably increased. Moreover, feeder units with a wear-resistant lining are extremely difficult to handle.

Similar problems arise in reduction furnaces for ores, in dissociation furnaces of chrome furnaces for example, in activating and regenerating furnaces for active carbon, etc.

It is an object of the invention to provide a simple apparatus with limited portions which are contacted by the feed material, which portions are simple and relatively easily replaced.

These and other objects and advantages are realized in accordance with the present invention relating to the operation of a kiln including feeding a granular material by means of a gas into said kiln, advancing said material through said kiln and removing product from said kiln. The improvement of the present invention comprises providing a wear-resistant mixer tube as the inlet to said kiln, blowing feeder gas from a nozzle into said tube spaced therefrom under a pressure greater than prevails in said kiln, and dropping said granular material about the outlet of said nozzle at a rate such that said granular material is conveyed by said gas into said tube.

The hole-type nozzle can also be surrounded by a ring-type nozzle through which a second liquid or pasty medium, or even a second granular material, may be delivered into the kiln. In this way, the material to be treated can be mixed before entering the kiln with substances which either supply the necessary energy or which serve as auxiliary substances. It has been found that this method of charging is particularly suitable for the roasting of sulfur-containing materials in fluidization and cylindrical rotary kilns. In this process, the sulfur-containing starting materials can, surprisingly, also be introduced into the fludization and cylindrical rotary kiln in moist form without giving rise to any disturbances.

The apparatus for carrying out the method according to the invention is described in more detail with reference to the accompanying drawing, in which the FIGURE is a schematic vertical section through the novel charging apparatus and rotary kiln inlet.

Referring now more particularly to the drawing, the material to be introduced into a fluidization and cylindrical rotary kiln falls through a feed hopper 1 into a housing 3 and, under the effect of a feeder gas issuing from a nozzle 2, is accelerated in an angularly downwardly directed mixer tube 4 to the speed at which it enters the kiln, for example from 5 to 30 m/second (normal conditions). In addition, the diameter of the hole-type nozzle and the delivery rate are so related that an excess pressure is maintained in the mixer tube 4 in comparison with the pressure prevailing in the kiln, pressure ratios of from about 1.5 to 5 generally being adequate. The nozzle 2 has to be arranged in such a way that the stream of material falls freely past the nozzle 2 and is conveyed into the mixer tube 4. Also, the diameter ratio of the nozzle 2 and the mixer tube 4, and the distance between the nozzle orifice and the mixer-tube inlet, have to be so interrelated that the impulse stream by which the material is accelerated does not collapse before entry into the mixer tube 4. Diameter ratios of from about 1 : 2 to 1 : 10 and spacings up to a distance equal to the nozzle diameter will generally be sufficient.

The mixer tube 4 is provided with a wear-resistant lining 5, preferably a ceramic lining. In addition, by the presence of a ring nozzle 6, a liquid or pasty phase, or even a second solid phase, can be introduced either through this ring nozzle or through the hole-type nozzle 2, the particular nozzle which is left free being available for the feeder gas.

In the charging of tacky materials, the wall of the feed hopper 1 can be wetted by means of a sprinkler ring 7 in order to avoid caking.

It is possible by using the flow mixing tube according to the invention to obtain a number of important advantages over conventional charging methods:

It is possible to charge materials differing widely in grain size, for example flotation pyrites (particles up to approximately 2 mm) and fine pyrites (particles up to approximately 6 mm).

The simple, streamlined design, especially in conjunction with the simultaneous feeding of liquid to form a film, prevents caking, especially in the case of tacky materials. The film can consist of a suitable liquid, for example a spent acid, fuel oil or water which is simultaneously used for wetting the walls of the feed hopper and supplied through the sprinkler ring. The simple combination and the smallness of the flow mixing tube enable highly wear-resistant materials to be used and only involve limited investment and repair costs. When repairs are necessary, the complete feeder unit according to the invention can readily be replaced very quickly by a corresponding spare part.

The flow mixing tube forms a gastight closure with respect to the fluidization and cylindrical rotary kiln, even when excess pressure prevails therein. The pressure seal prevents corrosion through condensing reaction gases, for example roaster gases.

Through the ring nozzle, a liquid, for example spent acid or fuel oil, can be introduced into the kiln in addition to the sulfur-containing material. Also, solid materials, for example soda in the dichromate manufacture from chromium ores, can also be introduced through the ring nozzle, as can solid energy-yielding materials, e.g. coal.

It will be appreciated that the instant specification and examples are set forth by way of illustration and not limitation and that various modifications and changes may be made without departing from the spirit and scope of the present invention.

What is claimed is:

1. In the operation of a kiln including feeding a granular material by means of a gas into said kiln, advancing said material through said kiln and removing a product from said kiln, the improvement in charging said kiln which comprises blowing feeder gas from a nozzle downwardly into a wear-resistant mixer tube at the inlet to said kiln under a pressure greater than prevails in said kiln, said nozzle being spaced from said tube, dropping said granular material about the outlet of said nozzle at a rate such that said granular material is conveyed by said gas into said tube and supplying a second material in an annular path surrounding said nozzle whereby said second material is also conveyed by said gas into said tube.

2. The process of claim 1, wherein the size of said nozzle, the amount and the pressure of said gas are such that the pressure in said tube is about 1.5 to 5 times the pressure in said kiln.

3. The process of claim 1, wherein said granular material is pyrites and said kiln roasts the granular material to produce sulfur dioxide.

4. The process of claim 3, wherein said pyrites is dropped about said nozzle from a hopper, and including the step of dropping liquid down the wall of said hopper so as to prevent caking in said hopper.

5. An apparatus comprising a kiln, a downwardly directed wear-resistant mixer tube constituting the inlet to said kiln, a gas-fed nozzle directed downwardly toward but spaced from said tube, means for supplying pressurized gas to said nozzle, a first supply of material, means for dropping granular material from said first supply about the outlet of said nozzle, an annular ring about said nozzle, and means to connect said ring to a second supply of material whereby said granular material from said first supply is forced by said gas leaving said nozzle into said tube and into said kiln and whereby said material from said second supply is also forced from said second supply through said annular ring into said tube by said gas leaving said nozzle.

6. An apparatus according to claim 5, wherein said tube and said nozzle are angularly directed downwardly and said granular supply means comprises a hopper, and a sprinkler ring for providing a liquid to line the inner surface to said hopper, granular material falling vertically from said hopper into the angularly downwardly directed gas flowing from said nozzle to said tube.

7. An apparatus according to claim 5, wherein said means for dropping granular material comprises a downwardly open hopper positioned to allow granular material to fall in front of said nozzle.

8. An apparatus according to claim 7, including and a sprinkler ring for providing a liquid to line the inner surface of said hopper.

* * * * *